US008639605B2

(12) United States Patent
Olof-Ors

(10) Patent No.: US 8,639,605 B2
(45) Date of Patent: Jan. 28, 2014

(54) SYSTEMS AND METHODS FOR THE IDENTIFICATION AND MESSAGING OF TRADING PARTIES

(75) Inventor: Mans Olof-Ors, London (GB)

(73) Assignee: Thomson Reuters Global Resources, Baar (CH)

( * ) Notice: Subject to any disclaimer, the term of this patent is extended or adjusted under 35 U.S.C. 154(b) by 640 days.

(21) Appl. No.: 11/408,803

(22) Filed: Apr. 21, 2006

(65) Prior Publication Data

US 2007/0250431 A1 Oct. 25, 2007

(51) Int. Cl.
*G06Q 40/00* (2012.01)

(52) U.S. Cl.
USPC ............. 705/36 R; 705/5; 705/13; 705/37; 709/217; 709/219; 709/227; 710/8; 370/229; 370/389; 370/395.21; 379/114.13; 455/456.1

(58) Field of Classification Search
USPC ............. 705/5, 13, 37; 709/217, 219, 227; 710/8; 370/229, 389, 395.21; 379/114.13; 455/456.1
See application file for complete search history.

(56) References Cited

U.S. PATENT DOCUMENTS

| 5,924,082 | A | 7/1999 | Silverman et al. | |
|---|---|---|---|---|
| 6,625,460 | B1 | 9/2003 | Patil | |
| 7,280,975 | B1 * | 10/2007 | Donner | 705/5 |
| 2002/0089610 | A1 * | 7/2002 | Ohno et al. | 348/734 |
| 2002/0120555 | A1 * | 8/2002 | Lerner | 705/37 |
| 2002/0138392 | A1 * | 9/2002 | LeBlanc | 705/37 |
| 2002/0188769 | A1 * | 12/2002 | Swidler et al. | 710/8 |
| 2003/0031174 | A1 * | 2/2003 | Laor | 370/389 |
| 2004/0083274 | A1 * | 4/2004 | Katiyar et al. | 709/217 |
| 2004/0198383 | A1 | 10/2004 | Choi | |
| 2004/0198386 | A1 * | 10/2004 | Dupray | 455/456.1 |
| 2004/0221043 | A1 * | 11/2004 | Su et al. | 709/227 |
| 2005/0038876 | A1 * | 2/2005 | Chaudhuri | 709/219 |
| 2005/0135242 | A1 * | 6/2005 | Larsen et al. | 370/229 |
| 2007/0050240 | A1 * | 3/2007 | Belani et al. | 705/13 |
| 2007/0127650 | A1 * | 6/2007 | Altberg et al. | 379/114.13 |
| 2007/0280262 | A1 * | 12/2007 | Larsen et al. | 370/395.21 |

OTHER PUBLICATIONS

Quotestream™—"Quotestream Wireless Frequently Asked Questions". [Retrieved Mar. 8, 2006]. Retrieved from Internet: URL: http://www.quotestream.com/wirelessinfo.php?qm_page=42029@usingq . . . , 3pgs.

Mobile Streams' Press, "The Case for Developing SMS and WAP", Business Communications Review International, Nov. 30, 2000. [Retrieved Mar. 8, 2006]. Retrieved from Internet: URL: http://www.mobilesms.com/show_press.asp?link=121, 2pgs.

(Continued)

*Primary Examiner* — James Trammell
*Assistant Examiner* — Sanjeev Malhotra
(74) *Attorney, Agent, or Firm* — Edwards Wildman Palmer LLP; Barry Kramer; David J. Silvia

(57) ABSTRACT

According to some embodiments, systems, methods, computer program code, and means are provided to receive a broadcast request and a message from a first mobile device where the first mobile device is associated with a first user, compare information in the message to information in a preferences database to match the message with at least a first recipient of the message, and to transmit the message to a second mobile device associated with at least the first recipient.

8 Claims, 5 Drawing Sheets

(56) References Cited

OTHER PUBLICATIONS

GenieTexter Tutorial. [Retrieved Mar. 8, 2006]. Retrieved from Internet: URL: http://www.genietexter.co.uk/tutorial.php, 6pgs.
FT.com/Site Services/FT Mobile/SMS, "SMS News Tracking", [Retrieved Mar. 8, 2006]. Retrieved from Internet: URL: http://news.ft.com/siteservices/ftmobile/sms, 2pgs.
"Register SMS Phone", Ipipi.com, [Retrieved Mar. 8, 2006]. Retrieved from Internet: URL: http://www.ipipi.com/help/helpsms.htm, 2pgs.
"Short message service", from Wikipedia, the free encyclopedia, [Retrieved Mar. 8, 2006]. Retrieved from Internet: URL: http://en.wikipedia.org/wiki/Short_message_service, 7pgs.
First Examination Report of the Indian Patent Office dated Nov. 17, 2011.

* cited by examiner

200

Receiving a broadcast request and a message to be broadcast

201

Matching one or more receiving users to the broadcast message

202

Broadcasting the broadcast message

Sending a broadcast request and a message to be broadcast

301

Receiving one or more responses to the broadcast message

SYSTEMS AND METHODS FOR THE IDENTIFICATION AND MESSAGING OF TRADING PARTIES

BACKGROUND

Advances in communications technology have changed the way many markets work. For example, in many areas, widespread availability and access to the Internet has benefited buyers and sellers of goods and services by providing easy access to pricing and market information. Unfortunately, this easy access to information is not available to everyone. For example (using an example that will be carried throughout this application), many sellers and producers of agricultural products may have difficulties finding buyers willing to buy their goods for a fair value.

Over half of the world's population derives their primary income from farming. The percentage is highest in the developing world. For example, the Indian economy is vast, having a population of over one billion, a resource-rich land mass, and one of the world's largest manufacturing sectors. The diverse Indian economy encompasses both traditional village farming and modern agriculture. About 24% of India's gross domestic product is derived from the agricultural sector that employs about 66% of the population. However, the overall literacy rate of India's population is only 65%. The land area under cultivation has risen steadily and is now greater than half of the nations land area. Major crops include rice, wheat, cereals, pulses, food grains, oilseeds (soyabean, groundnut, sunflower, mustard, and rapeseed), sugarcane/sugar, cotton, jute, and fruits.

Many farmers, even in extreme rural locations, now have access to cellular or portable telephones (generally referred to herein as "mobile telephones" or "mobile phones"). For example, the mobile phone market in India is the world's fastest growing mobile market, having currently over 76 million mobile users. Thanks to intense competition, consumers enjoy low call rates and access to networks. For example, India enjoys the world's lowest call cost, with rates at less than two (2) U.S. cents per minute.

Most farmers lack access to foreign markets, financial services, and news regarding commodity, weather, and political developments. The lack of access to this information can stifle growth in the agricultural sectors of developing countries like India. Since farmers often lack relevant and up-to-date information when bringing their produce to market, middlemen who typically have better knowledge of agricultural commodity pricing information, weather information, and news may be able to take advantage of the farmers lack of access to information.

The increasingly large growth of mobile phone usage in rural areas has dramatically removed one of the biggest obstacles of the agricultural community to access the information they need—connectivity.

BRIEF DESCRIPTION OF THE DRAWINGS

FIG. 2 is a block diagram of a method according to some embodiments.

FIG. 3 is a block diagram of a method according to some embodiments.

DETAILED DESCRIPTION

According to some embodiments, systems, methods, computer program code, and means are provided to receive a broadcast request and a message from a first mobile device, to compare information in the message to information in a preferences database, to match the message with at least a first recipient of the message, and to transmit the message to a second mobile device associated with at least the first recipient.

Much of the world relies on mobile devices as a primary communication device. The ability to deliver information anytime and anywhere is becoming increasingly critical. Embodiments described herein, and in our co-pending U.S. patent application Ser. No. 11/408,80, the contents of which are hereby incorporated by reference for all purposes, allow the delivery of relevant commodity and market information to groups of buyers and groups of sellers. Embodiments facilitate the ready identification of interested and relevant trading parties based on the status of a buyer, a seller, a commodity to be sold, and a location of the buyer and seller. In this manner, embodiments provide a more level playing field for all market participants, including individual farmers or other sellers of commodities.

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

For illustrative purposes, and to aid in understanding features of the invention, an example will now be introduced. This example will be carried through the detailed description and this example is not intended to limit the scope of the invention.

A farmer, as an example, who grows rice, may want to sell 100 pounds of rice at a price of 50 cents per pound. The farmer may call a central system, provide his home location and/or a radius from his home location, and the information about the quantity and price of the rice. Alternatively, the farmer may text message the central system with the prior mentioned information. The central system may match the information to a group of potential buyers and send a text or voice message to each potential buyer. In this example it is assumed that the farmer has a JAVA enabled mobile phone.

Figure 1:
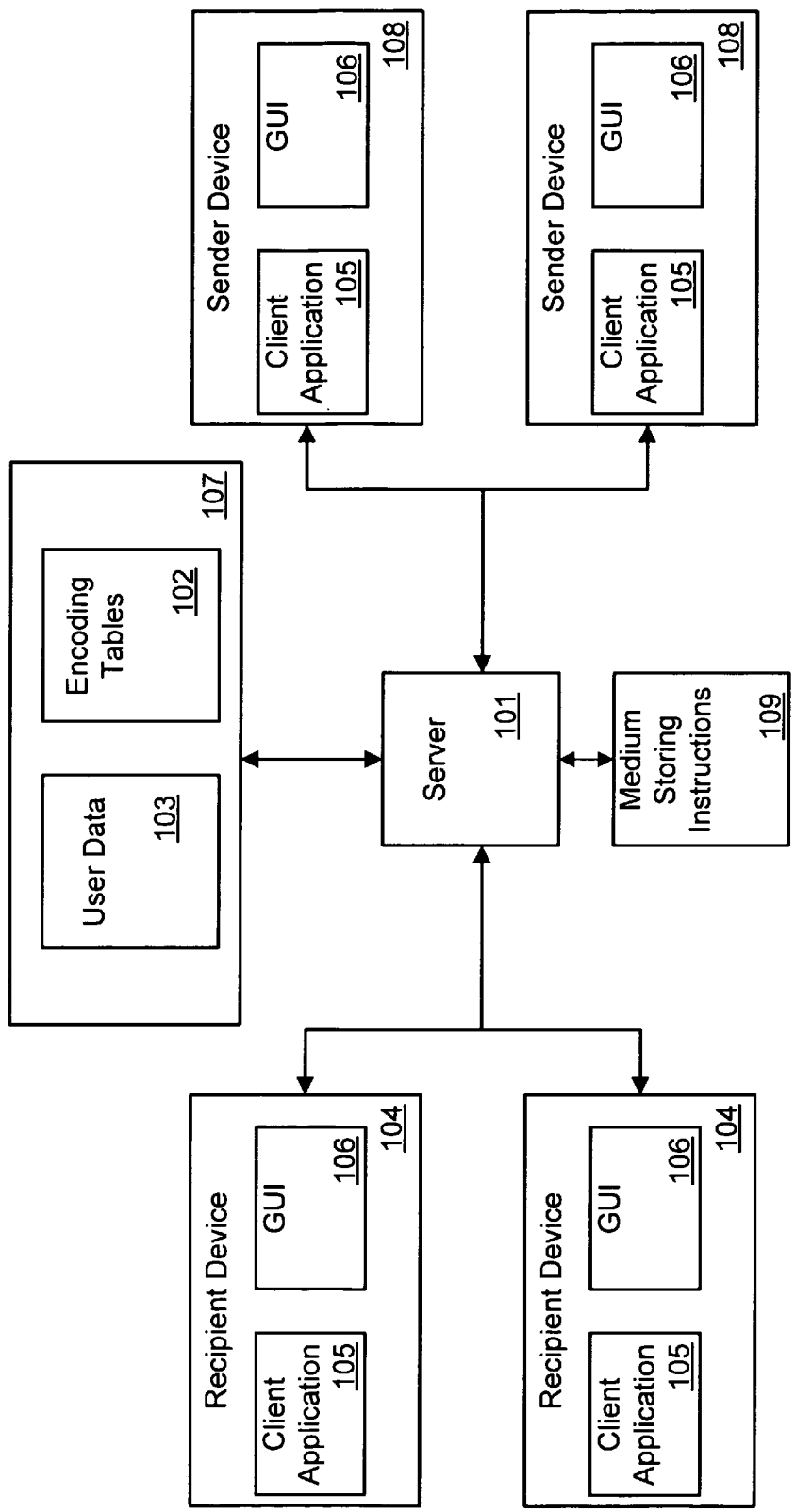
FIG. 1 is a block diagram of a system according to some embodiments.

Referring now to FIG. 1, an embodiment of a system 100 is shown. System 100 includes one or more recipient devices 104, one or more sender devices 108, a server 101, a medium storing instructions 109, and a database 107.

The server 101 may contain a processor and the server 101 may be any network server or personal computer. The processor may execute instructions stored in the medium 109. The medium 109 may be, but is not limited to, a disk drive, firmware, or read only memory. The server 101 may access a database 107. The database 107 may contain tables that include user data 103 and encoding tables 102.

The server 101 may receive a broadcast request and a message to be broadcast from a sender device 108. The server 101 may communicate with the sender device 108 through a variety of means such as, but not limited to, a landline, a wireless network, a telecom tower, and a satellite.

Using the example of the farmer, the farmer may send a text message that contains information identifying a request to sell, and a radius or distance that he is willing to travel from his home location. The text message also contains that the farmer has 100 pounds of rice for 50 cents a pound.

The sender device 108 may be a non-mobile device or a mobile device. In one embodiment, the sender device 108 may be any mobile device including, but not limited to, mobile phones, personal data assistants, and handheld personal computers. The recipient device 104 may a non-mobile device or a mobile device. In a preferred embodiment, the recipient device 104 may be any mobile device including, but not limited to, mobile phones, personal data assistants, and handheld personal computers. However, the recipient device 104 or the sender device 108 may also be any type of personal computer, desktop, or notebook computer. Each recipient device 104 and sender device 108 may have a client application 105 and a graphical user interface ("GUI) 106.

The broadcast request may contain information identifying the home location of the sender, a radius or distance from the home location, and a buy/sell indication. The broadcast request and the message to be broadcast may each be part of a same data stream. The server 101 may receive a request from a sender device 108 requesting that data be sent to a recipient device 104. The broadcast request may be implemented by, but not limited to, a voice message, text message, or voice response system for example a Voice Response Unit ("VRU") or an Interactive Voice Response ("IVR") unit.

Using the example of the farmer, the farmer may want to only travel 30 miles from his current location. As part of broadcast request, the farmer may enter information identifying his current location and specifying that he only wishes to travel a distance less than 30 miles from the current location.

The server 101 may match the data contained in the broadcast request and the message to one or more appropriate recipients. The matching criteria may be based on, for example, function, location, and commodity trading preferences.

Examples of a commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity where the market prices are determined by the same exchange. Another example of a trading preference may include an indication of a first commodity, an indication of a second commodity, a market price for the first commodity and a market price for the second commodity, where the market prices are determined by different exchanges.

The location of the recipient may be determined through a variety of means. Some examples of determining the location of the recipient are triangulating signals from a plurality of telecom towers, locating the latitude and longitude of the user by a global positioning system, analyzing a subscription pattern of weather and market content, and examining a recipient's profile. The recipient profile may contain, but is not limited to, an address, a mobile phone number, and an area code.

Using the example of the farmer, the farmer will be matched to buyers within a 30-mile radius of the farmer's location. Only those buyers that whose profile indicates that they want to buy 100 pounds of rice for a price of 50 cents a pound will be sent the message from the seller.

The message to be broadcast may contain contact information, an indication of one or more commodities, a time stamp including a date and a time, and a respective price for each commodity. The price may be a price to buy or a price to sell. The contact information may be, but is not limited to, a telephone number, an instant messenger identification, a voice mailbox, and an email address. The message to be broadcast by the server 101 to the recipient devices 104 may be, but is not limited to, a voice message, an encoded text message, or a clear text message.

The data sent in an encoded text message may be encoded by the use of encoding tables 102. In the present embodiment, the encoding tables 102 are stored in the database 107. However, in other embodiments, the coding tables may be stored in read only memory, software, firmware, or any other storage mechanism.

In another embodiment, the sender device 108 associated with a buyer may send a broadcast request and a message to be broadcast containing an order for a specific quantity of goods or commodities to the server 101. The server 101 may match the information in the message to be broadcast with a potential seller of the good or commodity contained in the message. In some embodiments, the buyer may send a response to the sending device 108 or the buyer may send a response to the server 101 and the server 101 will send a response to the sending device 108. The response may include, but is not limited to, an acknowledgement, a rejection, or an inquiry requesting more information. In some embodiments, the buyer may be a group of buyers and the seller may be a group of sellers.

Referring now to FIG. 2, an embodiment of a method 200 is shown. At 201, a system may receive a broadcast request and a message to be broadcast. The broadcast request may contain the home location of the sender, a radius from the home location, and a buy/sell indication. The broadcast request and the message to be broadcast may each be part of the same data stream. The broadcast request may be implemented by, but not limited to, a voice message, text message, or voice response system for example a Voice Response Unit ("VRU") or an Interactive Voice Response ("IVR") unit.

Using the example of the farmer, the farmer may either send a text message containing the broadcast request and message to be broadcast from his mobile device. Alternatively, the farmer may call into the central system and proceed through a series of voice prompts to relay his request and message to be broadcast.

At 202, the system may match one or more recipients to the broadcast message. The system may match the data contained in the broadcast request and the message to one or more appropriate recipients. The matching criteria may be based on location, and commodity trading preferences.

Examples of a commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity where the market prices are determined by the same exchange. Another example of a trading preference may include an indication of a first commodity, an indication of a second commodity, a market price for the first commodity and a market price for the second commodity, where the market prices are determined by different exchanges.

The location of the recipient may be determined through a variety of means. Some examples of determining the location of the recipient are triangulating signals from a plurality of telecom towers, locating the latitude and longitude of the user by a global positioning system, analyzing a subscription pattern of weather and market content, and examining a recipient's profile. The recipient profile may contain, but is not limited to, an address, a mobile phone number, and an area code.

At 203, the system broadcasts the message to the one or more devices associated with one or more recipients. The message to be broadcast may contain contact information, an indication of one or more commodities, a time stamp including a date and a time, and a respective price for each commodity. The price may be a price to buy or a price to sell. The contact information may be, but is not limited to, a telephone number, an instant messenger identification, a voice mailbox, and an email address. The message to be broadcast by the server to the recipient devices may be, but is not limited to, a voice message, an encoded text message, or a clear text message.

The data sent in an encoded text message is encoded by the use of encoding tables. In the present embodiment, the encoding tables are stored in the database. For example, an encoding table may map short names or labels for each commodity, exchange, and other information. As a specific example, the Multi-Commodity Exchange of India (or "MCX") may be mapped to a short form of "M", and commodities traded on the exchange, including pepper, and sugarcane, may be mapped to the short forms of "P" and "S" respectively. A message to be mapped using the encoding table is, thereby, substantially reduced in size while providing detailed information to trading parties. However, in other embodiments, the coding tables may be stored in read only memory, software, firmware, or any other storage mechanism. In some embodiments, data is transmitted using encoded short message service ("SMS") text messages. Certain SMS messages may be limited to 160 characters, which may limit the amount of information that may be sent within an SMS text message. However, encoding SMS messages may allow significantly more information to be sent within the 160-character limit. In some embodiments, Unstructured Supplementary Service Data ("USSD") messaging may be used. Those skilled in the art will appreciate that other encoding techniques may be used.

Referring now to FIG. 3, an embodiment of a method 300 is shown. At 301, a sending device sends a broadcast request and a message to be broadcast to a system. The broadcast request may contain the home location of the sender, a radius from the home location, and a buy/sell indication. The broadcast request and the message to be broadcast may each be part of the same data stream. The server 101 may receive a request from a sender device requesting that data be sent to a recipient device. The broadcast request may be implemented by, but not limited to, a voice message, text message, or voice response system for example a Voice Response Unit ("VRU") or an Interactive Voice Response ("IVR") unit.

The message to be broadcast may contain, but is not limited to, contact information, an indication of one or more commodities, a time stamp including a date and a time, and a respective price for each commodity. The price may be a price to buy or a price to sell. The contact information may be, but is not limited to, a telephone number, an instant messenger identification, a voice mailbox, and an email address. The message to be broadcast by the server to the recipient devices may be, but is not limited to, a voice message, an encoded text message, or a clear text message.

The data sent in an encoded text message is encoded by the use of encoding tables. In the present embodiment, the encoding tables are stored in a database. However, in other embodiments, the coding tables may be stored in read only memory, software, firmware, or any other storage mechanism.

At 302, the sender may receive a response from one or more recipients. The response may be, but is not limited to, a phone call, a text message, or a voice mail. The text message may be a clear text message or an encoded text message. The response may include an acceptance of the terms in the message, a rejection of the terms of the message, or may contain a counteroffer.

Figure 4:
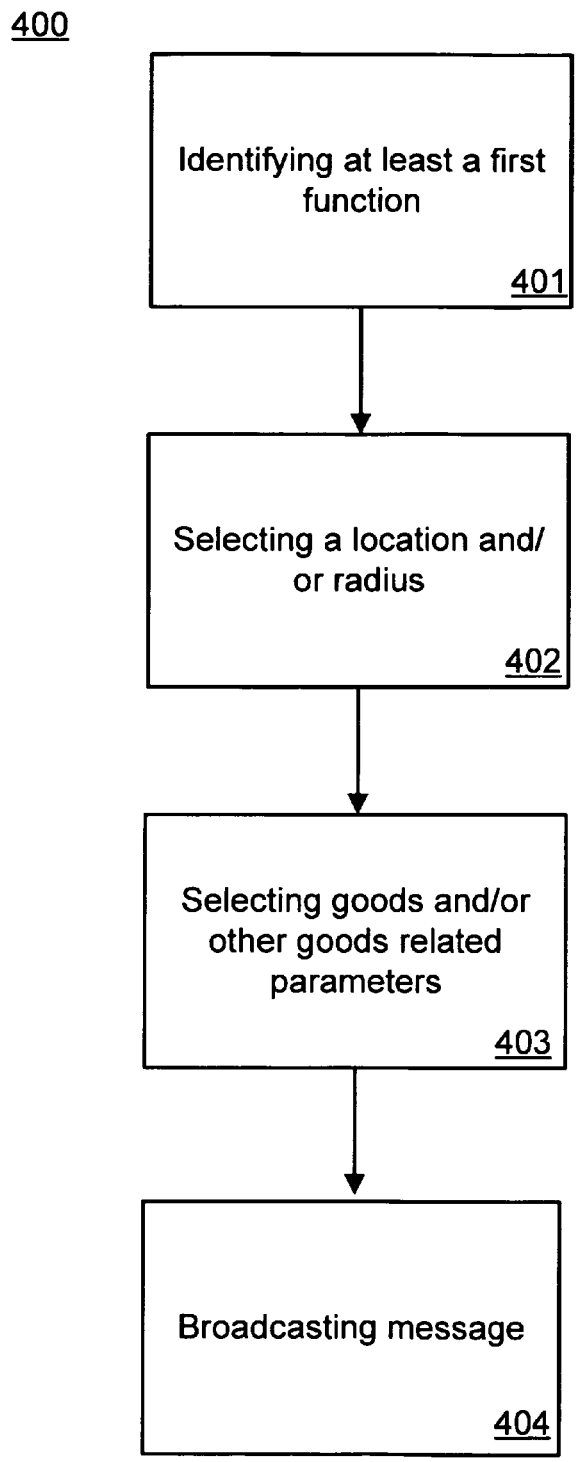
FIG. 4 is a block diagram of a method according to some embodiments.

Referring now to FIG. 4, an embodiment of a method 400 is shown. An example of one embodiment of the method is creating a broadcast request and a message to be broadcast. At 401, a sender may identify his function. Examples of functions may be, but are not limited to, a buyer, a seller, and/or transportation.

At 402, the sender may define a location preference to broadcast the message. The location preference may be, but is not limited to, an area code, a zip code, a telephone exchange, a latitude and longitude.

At, 403, the user may select commodity related preferences. Examples of a commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity where the market prices are determined by the same exchange. Another example of a trading preference may include an indication of a first commodity, an indication of a second commodity, a market price for the first commodity and a market price for the second commodity, where the market prices are determined by different exchanges.

At 404, the sender instructs the system to broadcast the message according to the parameters. The system may broadcast the broadcast message to one or more recipient devices associated with one or more recipients.

Figure 5:
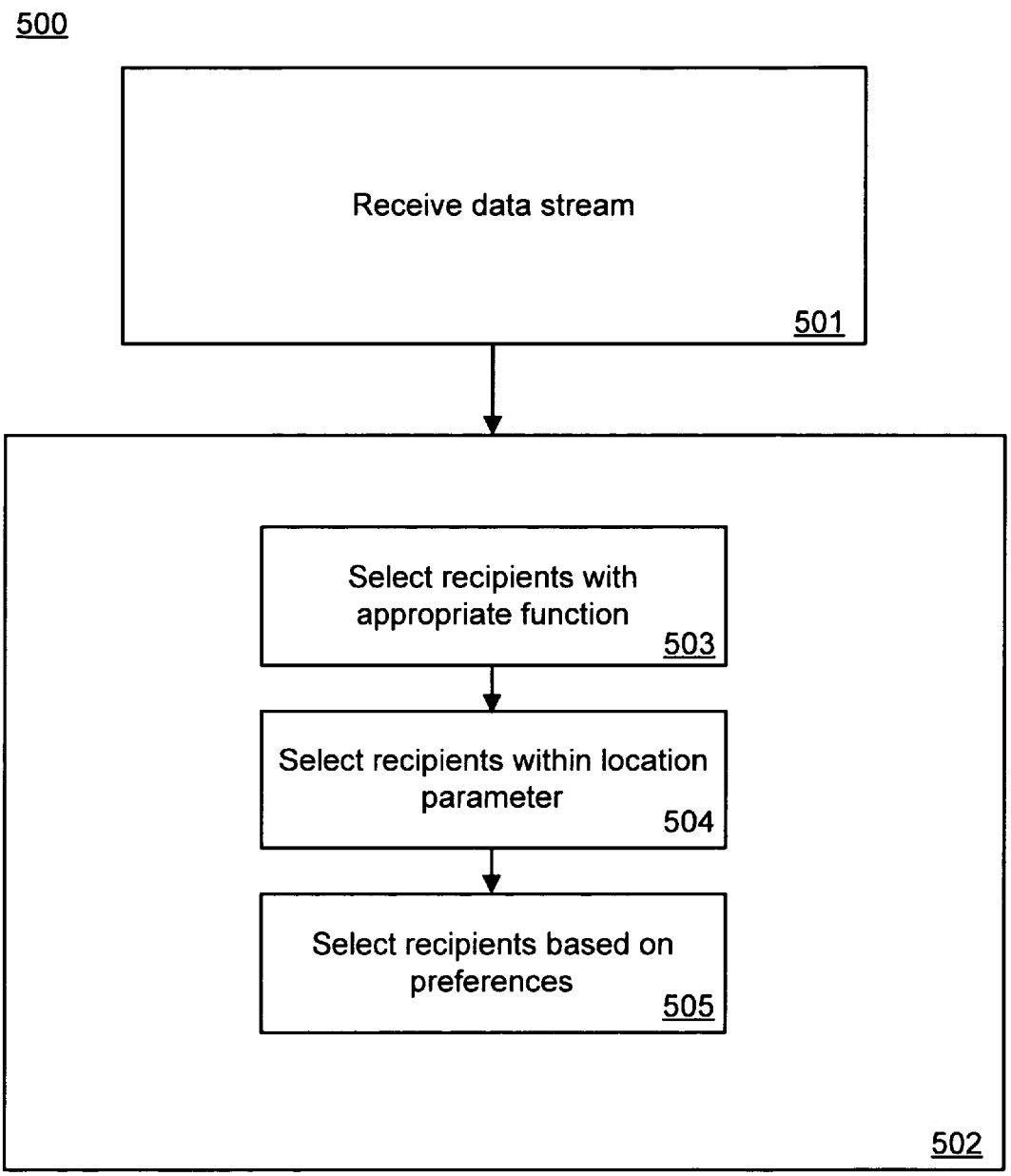
FIG. 5 is a block diagram of a method according to some embodiments.

Referring now to FIG. 5, an embodiment of a method 500 is shown. At 501, a data stream is received. The data stream may be broken into a broadcast request and a message to be broadcast.

The broadcast request may contain the home location of a sender, a radius from the home location, and a buy/sell indication. The broadcast request and the message to be broadcast may each be part of the same data stream. A server may receive a request from a sender device requesting that data be sent to a recipient device. The broadcast request may be implemented by, but not limited to, a voice message, text message, or voice response system for example a Voice Response Unit ("VRU") or an Interactive Voice Response ("IVR") unit.

The message to be broadcast may contain, but is not limited to, contact information, a time stamp including a date and a time, an indication of one or more commodities, and a respective price for each commodity. The price may be a price to buy or a price to sell. The contact information may be, but is not limited to, a telephone number, an instant messenger identification, a voice mailbox, and an email address.

At 502, the information contained in the data stream is matched to find appropriate recipients for the message to be broadcast. At 503, recipients with the appropriate function are matched. Some examples of function are, but not limited to, buyers and sellers. At 504, recipients with matching locations are selected. The location preference may be, but is not limited to, an area code, a zip code, a telephone exchange, and a latitude and longitude of the recipient. At 505, recipients with matching preferences are selected.

Examples of preferences may be, but are not limited to, commodity trading preferences. A commodity trading preference may include an indicated commodity, an indicated exchange, and a market price of the commodity as determined by the indicated exchange. Indications of multiple commodities and/or indications of multiple exchanges or combinations thereof may also be used as a commodity trading preference. For example, a trading preference may include an indication of a first commodity, an indication of a second commodity, a market price for the first commodity and a market price for the second commodity where the market prices are determined by the same exchange. Another example of a trading preference may include an indication of a first commodity, an indication of a second commodity, a market price for the first commodity and a market price for the second commodity, where the market prices are determined by different exchanges.

The foregoing disclosure has been described with reference to specific exemplary embodiments thereof. It will, however, be evident that various modifications and changes may be made thereto without departing from the broader spirit and scope set forth in the appended claims.

What is claimed is:

1. A system comprising:
   a preferences database, comprising a first set of information, the first set of information comprising a function, a set of commodity trading preferences, and location data corresponding to at least one potential recipient;
   a medium storing processor-executable instructions; and
   a server in communication with the medium and the preferences database, the server having a processor adapted to execute the processor-executable instructions to:
   receive a broadcast request and a message in a single data stream, the broadcast request comprising a second set of information related to a location of a sender of the message;
   compare a matching criteria generated from at least a portion of the single data stream with at least a portion of the first set of information to select at least one matching recipient from the at least one potential recipient based on the respective function, set of commodity trading preferences, and location data corresponding to the at least one potential recipient selected; and
   transmit the message to a device associated with at least one matching recipient.

2. The system of claim 1, wherein the message is received in an encoded form.

3. The system of claim 1, wherein the message is transmitted in an encoded form.

4. The system of claim 1, wherein the message is at least one of a voice message, a text message, a short message service text message, and an encoded short message service text message.

5. The system of claim 1, wherein a location of at least one potential recipient is determined by the server by at least one of the following:
   analyzing a subscription pattern of weather and market content;
   examining a user profile that contains at least one of an address, a mobile phone number, and an area code; and
   triangulating signals.

6. The system of claim 1, wherein the comparing by the server is based on at least one of a type of a physical commodity, a grade of the physical commodity, and an available volume of the physical commodity.

7. The system of claim 1, wherein the comparing by the server is based on a first preset price limit and a second preset price limit.

8. The system of claim 1, wherein the message includes at least two of an indication of a physical commodity, a price of the physical commodity, a quantity of the physical commodity, and user contact information.

\* \* \* \* \*